United States Patent
Didden et al.

(12)

(10) Patent No.: US 6,271,766 B1
(45) Date of Patent: Aug. 7, 2001

(54) DISTRIBUTED SELECTABLE LATENT FIBER OPTIC SENSORS

(75) Inventors: F. Kevin Didden, Wallingford; Arthur D. Hay, Cheshire, both of CT (US)

(73) Assignee: CiDra Corporation, Wallingford, CT (US)

( * ) Notice: Subject to any disclaimer, the term of this patent is extended or adjusted under 35 U.S.C. 154(b) by 0 days.

(21) Appl. No.: 09/219,908

(22) Filed: Dec. 23, 1998

(51) Int. Cl.$^7$ ....................................................... G01V 3/00
(52) U.S. Cl. ...................... 340/853.1; 340/853.3; 340/854.7; 359/110; 359/143
(58) Field of Search .................. 340/825.06, 825.07, 340/825.08, 825.1, 825.15, 825.16, 555, 531, 854.7, 853.1, 853.3, 856.3, 853.9, 853.7; 359/142–144, 110; 250/227.14, 227.22

(56) References Cited

U.S. PATENT DOCUMENTS

| | | | |
|---|---|---|---|
| 4,491,983 | * 1/1985 | Pinnow et al. | 455/612 |
| 4,636,031 | 1/1987 | Schmadel. Jr. et al. | 350/96.19 |
| 4,864,489 | * 9/1989 | Yasuhara et al. | 370/85.12 |
| 4,915,467 | 4/1990 | Berkey | 350/96.15 |
| 5,007,705 | 4/1991 | Morey et al. | 350/96.29 |

(List continued on next page.)

FOREIGN PATENT DOCUMENTS

| | | |
|---|---|---|
| 0359351 | 9/1992 | (EP) . |
| WO9909370 | 2/1999 | (WO) . |

OTHER PUBLICATIONS

Hu, Chen, Zhang, Bennion: "Multiplexing Bragg Gratings using Combined Wavelength and Spatial Division Techniques with Digital Resolution Enhancement" Electronics Letters, vol. 33, No. 23, Nov. 6, 1997, pp. 1973–1975, XP000773537, Stevenage, Herts, GB, p. 1973–p. 1975, Figs. 1 & 2.

M.G. Xu, Geiger and J. P. Dakin for "Fibre grating pressure sensor with enhanced sensitivity using a glass–bubble housing"—Electronics Letters—18$^{th}$ Jan. 1996 vol. 32, No. 2.

Quartzdyne, Inc., Series QU/QG Spec Specification Sheet and p. 6, Section 1, General Information taken from Quartzdyne Pressure Transducers General Catalog and Operating Manual for Quartzdyne Downhole High Pressure Transducers (Series QU, QG, QL, TMC, 1XP and LP) Apr. 1, 1997.

"The Thickness–Shear Quartz Resonator: A Rugged, Precision Pressure Transducer" Product Feature from SENSORS, Jul. 1990.

*Primary Examiner*—Donnie L. Crosland

(57) ABSTRACT

Distributed selectable fiber optic sensing system include a plurality of fiber grating sensors 12 connected to an optical fiber 10 and installed in an oil/gas well 15 and an instrumentation box 20 at the surface which selects which of the sensors 12 to activate, or provide output data from to a display 26 or to a remote link 32, such as the internet. The box 20 has a transceiver/converter 22 which provides a source optical signal 14 and receives a return optical signal 16,18 and which converts the return signal 16,18 to a signal indicative of the parameters being measured by the sensors 12. A sensor selection signal is provided from the remote link 32, the keyboard 28 to the converter 22 which is indicative of which of the sensors 12 to be selected to provide output data for. The end user only pays for the sensors 12 that are selected. Each of the sensors 12 may be similar to any fiber optic grating-based sensor that measures one or more parameters, such as pressure, temperature, liquid fraction, flow, acoustic, seismic, resistivity, corrosion, pipe wall build-up, or other parameters.

28 Claims, 3 Drawing Sheets

U.S. PATENT DOCUMENTS

| | | | |
|---|---|---|---|
| 5,042,898 | 8/1991 | Morey et al. | 385/37 |
| 5,235,659 | 8/1993 | Atkins et al. | 385/124 |
| 5,399,854 | 3/1995 | Dunphy et al. | 250/227.17 |
| 5,469,520 | 11/1995 | Morey et al. | 385/37 |
| 5,512,078 | 4/1996 | Griffin | 65/484 |
| 5,578,106 | 11/1996 | Fleming, Jr. et al. | 65/391 |
| 5,682,453 | 10/1997 | Daniel et al. | 385/99 |
| 5,684,297 | 11/1997 | Cable | 250/227.14 |
| 5,691,999 | 11/1997 | Ball et al. | 373/20 |
| 5,732,776 * | 3/1998 | Tubel et al. | 166/250.15 |
| 5,745,626 | 4/1998 | Duck et al. | 385/96 |
| 5,804,713 | 9/1998 | Kluth | 73/152.01 |
| 5,808,779 * | 9/1998 | Weis | 359/290 |
| 5,818,585 | 10/1998 | Davis et al. | 356/345 |
| 5,841,131 | 11/1998 | Schroeder et al. | 250/227.17 |
| 5,917,405 * | 6/1999 | Joao | 340/426 |

\* cited by examiner

SENSOR SELECTION SIGNAL

| Sensor #: | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Signal: | 1 | 0 | 1 | 0 | 1 | 1 | 0 | 0 | 0 | 1 | 0 | 1 | 1 | 1 | 0 | 0 |
| Status: | ON | OFF | ON | OFF | ON | ON | OFF | OFF | OFF | ON | OFF | ON | ON | ON | OFF | OFF |

DISTRIBUTED SELECTABLE LATENT FIBER OPTIC SENSORS

TECHNICAL FIELD

This invention relates to fiber optic pressure sensors, and more particularly to a selectable optical sensors.

BACKGROUND ART

Various sensing technologies exist for measuring various physical parameters in the environment of an oil well such as pressure and temperature, such as electronic strain gauge, quartz-based oscillation, distributed temperature sensing (e.g., using Raman back-scattering or Bragg gratings), or distributed optical pressure sensing using Bragg gratings, such as is discussed in Ser. No. 08/925,598 entitled "High Sensitivity Fiber Optic Pressure Sensor for Use in Harsh Environments" to Robert J. Maron, or distributed optical liquid fraction sensing using fiber optics, such as is discussed in and Ser. No. 09/105,534 entitled "Fluid Parameter Measurement in Pipes Using Acoustic Pressures".

In certain sensing applications, such as applications in the oil and gas industry, it may be desirable to sense different parameters, the same parameter, or different locations, at different times in the life of an oil well. For example, it may initially be desirable to sense pressure at a single or limited number of locations within a well when the well is first placed into production. Later in the life of the well, it may be desirable to sense pressure and temperature on a distributed basis within the well. Alternatively, it may be desirable to sense different parameters of interest later in the life of the well such as liquid fraction, dynamic pressure.

From a well operator's point of view, it is undesirable to pay for information that is not needed. Therefore, the well operator may be willing to pay a premium for certain information early in the life of a well, and other different information later in the life of a well. However, it is extremely costly to intervene in an operating well to install sensors and equipment because of lost production when the well is being worked and the cost of actually doing the work, particularly in harsh environments, such as on an off shore platform.

SUMMARY OF THE INVENTION

Objects of the present invention include provision of a sensor which can be selectively interrogates on demand without intervention.

According to the present invention, a distributed selectable fiber optic sensing system, comprises an optical fiber; a plurality of optical sensors, each sensor connected to said optical fiber and each sensor using only optical signals to measure sensed parameters, predetermined ones of said sensors receiving an optical source signal, and each providing at least one characteristic return optical signal, a parameter of said return optical signal being indicative of a sensed parameter; and an optical instrumentation device, connected to said optical fiber, which provides said optical source signal to predetermined ones of said sensors, which receives said return optical signal, and which provides an output signal indicative of selected ones of said sensed parameters, said selected ones of said sensed parameters being less than a total number of said sensed parameters.

According further to the present invention, the instrumentation device selects the selected ones of the sensed parameters based on a selection signal having a selection status corresponding to each of the sensors. According further to the present invention, the status of the selection signal is determined based on whether a user desires to retrieve the sensed parameter. According further to the present invention, the status of the selection signal is determined based on whether a user will pay for the sensed parameter. According further to the present invention, the status of the selection signal is provided from a location remote from the instrumentation device. According still further to the present invention, the status of the selection signal is provided from a location remote to the instrumentation device via a remote link. According still further to the present invention, at least one of the sensors comprises at least one Bragg grating embedded therein.

According to a second aspect of the present invention, a method of paying for use of an optical sensing system, comprises the steps of installing a plurality of fiber optic sensors; providing data to a user for a selected ones of the sensors; and the user paying for the selected sensors.

According further to the present invention, selecting the selected sensors based on a selection signal corresponding to each of the sensors. According further to the present invention, receiving a selection signal corresponding to each of the sensors, which determines the selected sensors.

According to a third aspect of the present invention, a method of billing for use of an optical sensing system, comprises the steps of installing a plurality of fiber optic sensors; providing data to a user for a selected ones of the sensors; and billing the user for the selected sensors.

According further to the present invention, selecting the selected sensors based on a selection signal corresponding to each of the sensors. According further to the present invention, receiving a selection signal corresponding to each of the sensors, which determines the selected sensors.

The present invention provides distributed selectable patent fiber optic sensing system which are activated, enabled, excited, illuminated interrogated, or otherwise provides data to a user (or well operator) on demand. This may be part of a system where the user pays for only the sensor data retrieved from the sensor or instrumentation. Such a system allows the user to install latent (or dormant) sensors when the well is drilled that are accessed by the user only when they are needed, thereby saving significant expense later in the well life when more or different sensors and/or parameters are needed to be sensed by the user. The invention also allows for automatic sensor selection reconfiguration without user intervention.

A sensor may be de-selected (or inactivated or "off") using the instrumentation at the surface, for example, by not illuminating the sensor at its characteristic wavelength, or by not converting the optical signals from such sensor to electrical signals, or by not providing sensor output data on the display screen or to the remote link, or by otherwise interrupting the sensor output data to the user. When a dormant sensor is selected (or activated or "on"), data from such sensor is provided by such instrumentation to the user and the price charged to the user is adjusted accordingly. Alternatively, the sensor selection signal may shut off all sensors (or all sensor data) if a bill is not paid by the user. The cost to (or payment by) the user may be based on the number of sensors selected, the amount of data provided or the length of time the data is provided, similar to that which is done for a utility company, a cable TV company, an internet service provider or the like. Alternatively, the sensor data may be selected from a remote site such as by satellite communications and/or by the internet which will trigger billing the user at a price indicative of the sensors activated.

Also, one or more gratings, fiber lasers, or a plurality of fibers may be used in the sensors. Also, the invention may be used with any type of sensing such as such as pressure, temperature, liquid fraction, flow, acoustic, seismic, resistivity, corrosion, pipe wall build-up (e.g., wax, paraffins, asphaltenes, scales, hydrates or other hydrocarbon by-products), or other parameters.

The foregoing and other objects, features and advantages of the present invention will become more apparent in light of the following detailed description of exemplary embodiments thereof.

BEST MODE FOR CARRYING OUT THE INVENTION

Figure 1:
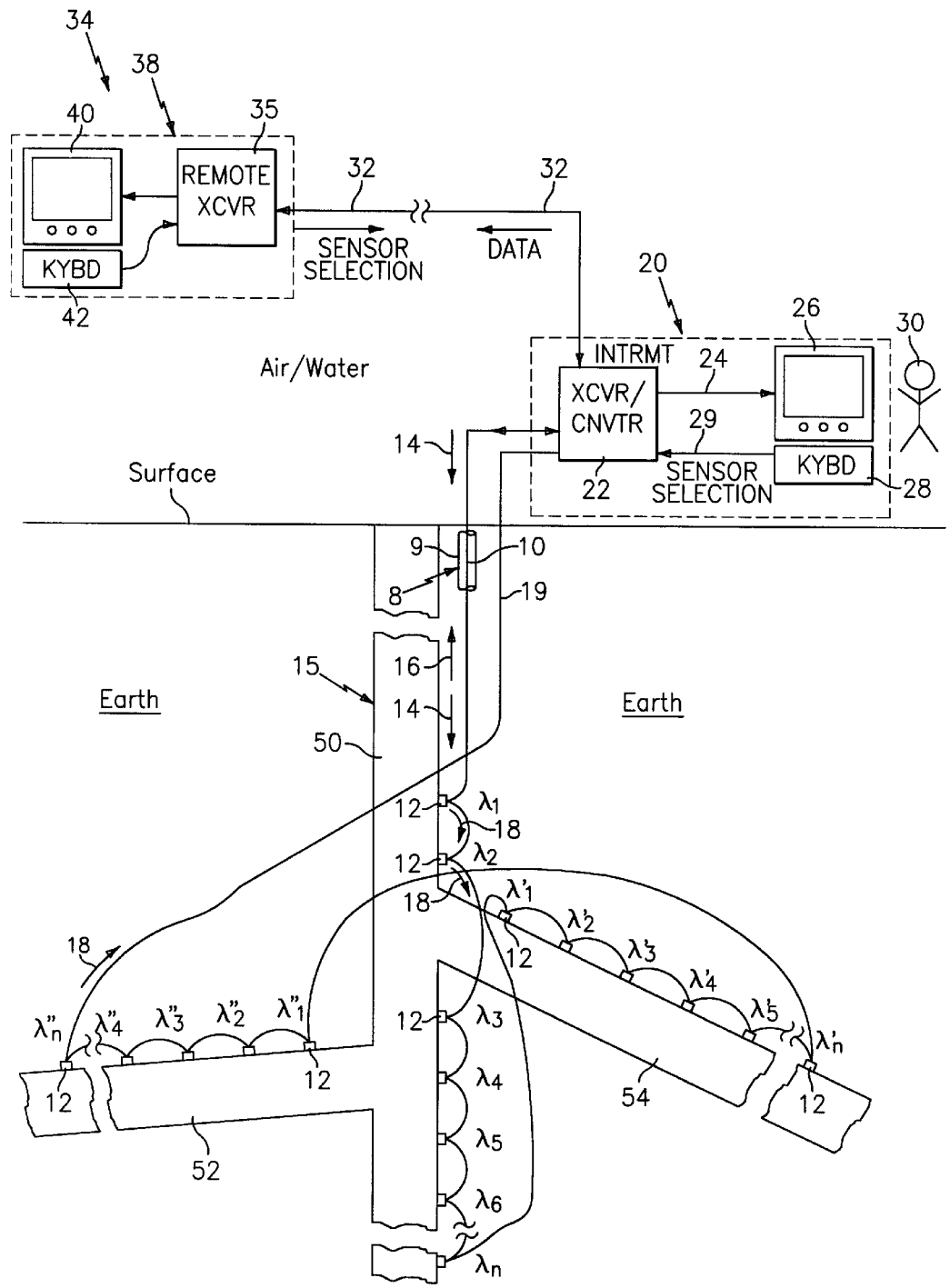
FIG. 1 is a schematic diagram of a well fitted with distributed selectable fiber optic sensors, connected in series, in accordance with the present invention.

Referring to FIG. 1, a selectable latent fiber optic sensing system comprises a transmission cable 8 having an outer protective shell such as a stainless steel capillary tube 9 with optical waveguide or fiber 10 therein. Other transmission cables may be used if desired.

A plurality of optical grating based sensors 12 are disposed along and coupled to the optical fiber 10, e.g., by having the sensors 12 be feed-through sensors and being connected in series to the common optical fiber 10. Each of the sensors 12 may be similar to any fiber optic grating-based sensor that measures one or more parameters, such as pressure, temperature, liquid fraction, flow, acoustic, seismic, resistivity, corrosion, pipe wall build-up (e.g., wax, paraffins, asphaltenes, scales, hydrates or other hydrocarbon by-products), or other parameters. The sensors 12 may have a design comprising or similar to one or more of those described in commonly owned copending U.S. patent application Ser. No. 09/205,847 entitled "Tube-Encased Strain-Isolated Fiber Grating Temperature Sensor", Ser. No. 09/205,944, entitled "Tube-Encased Fiber Grating Pressure Sensor", Ser. No. 08/925,598 entitled "High Sensitivity Fiber Optic Pressure Sensor for Use in Harsh Environments" to Robert J. Maron, and Ser. No. 09/105,534 entitled "Fluid Parameter Measurement in Pipes Using Acoustic Pressures", or as is described in U.S. Patents, such as U.S. Pat. No. 5,513,913, entitled "Active Multipoint Fiber Laser Sensor", U.S. Pat. No. 4,996,419, entitled "Distributed Multiplexed Optical Fiber Bragg Grating Sensor Arrangement", to Morey, U.S. Pat. No. 4,950,883, entitled "Fiber Optic Sensor Arrangement Having Reflective Gratings Responsive to Particular Wavelengths", to Glenn, U.S. Pat. No. 5,564,832, entitled "Birefringent Active Fiber Laser Sensor", U.S. Pat. No. 5,401,956, entitled, "Diagnostic System For Fiber Grating Sensors" to Dunphy et al, or U.S. Pat. No. 5,426,297, entitled "Multiplexed Bragg Grating Sensors" to Dunphy et al, which are incorporated herein by reference to the extent necessary to understand the present invention. Any other fiber grating sensors now known or yet to be developed may be used if desired.

The sensors 12 are installed at predetermined distributed multi-point locations along a production tube or casing of an oil or gas well 15. The well 15 may have a vertical section 50 and/or one or more horizontal, angled, or lateral sections 52,54 along which the sensors may be distributed.

Light 14 is launched along the fiber 10 from an instrumentation box 20, which is incident on the sensors 12. Each of the sensors 12 provides a return signal 16 indicative of a characteristic wavelength(s) for each of the sensors 12. In particular, the sensors 12 may each have a reflection wavelength $\lambda_1,\lambda_2,\lambda_3$, etc., each of which varies based on the parameter measured by the sensor 12. For example, the source light 14 may be a broad wavelength band light and each sensor 12 reflects a portion thereof as indicated by a line 16 having a predetermined wavelength band of light centered at a reflection wavelength $\lambda 1$, and passes the remaining wavelengths of the incident light 14 (within a predetermined wavelength range), as indicated by a line 18. If desired, the fiber 10 may have a return path 19 to provide redundancy (loop) in case of single break or for monitoring the transmitted light 18 signals.

If fiber lasers are used for certain of the sensors 12, each such sensor would provide a characteristic lasing wavelength $\lambda_1,\lambda_2,\lambda_3$, etc., that varies with the parameter being measured. If Fabry-Perot resonators are used for certain of the sensors 12, each of such sensors would provide a characteristic resonant wavelength $\lambda_1,\lambda_2,\lambda_3$, etc., that varies with the parameter being measured.

The instrumentation box 20 comprises an optical transceiver/converter 22 comprising a known broadband source, a scanned laser light source, or other suitable known optical source to provide the incident light 14. Also, the converter 22 comprises a known suitable spectrum analyzer or other known opto-electronic measuring equipment to decode and measure the resultant wavelength or other optical parameter shift of the returned light (reflected 16 and/or transmitted 18) from the sensors 12 and convert it to a parameter measurement, and provides a signal indicative of the parameter being measured on a line 24.

Any known multiplexing techniques may be used by the instrumentation box 20 to distinguish one sensor signal from another sensor signal, such as wavelength division multiplexing (WDM) or time division multiplexing (TDM) or other multiplexing techniques. In that case, the characteristic or reflection wavelength of the grating (or gratings) in each sensor 12 may have one or more different reflection or characteristic wavelength(s) (e.g., $\lambda 1,\lambda 2,\lambda 3,\lambda n$).

The transceiver/converter 22 may be any device that receives and transmits optical signals to the sensors 12 and provides output signals indicative of the parameters being measured by the sensors 12. In particular, the transceiver/converter 22 may use any type of optical grating-based measurement technique, e.g., scanning interferometric, scanning fabre perot, acousto-optic tuned filter, optical filter, etc., having sufficient sensitivity to measure the parameter being measured by the sensor, such as that described in one or more of the following references: A. Kersey et al., "Multiplexed fiber Bragg grating strain-sensor system with a Fabry-Perot wavelength filter", Opt. Letters, Vol 18, No. 16, August 1993, U.S. Pat. No. 5,493,390, issued Feb. 20, 1996 to Mauro Verasi, et al., U.S. Pat. No. 5,317,576, issued May 31, 1994, to Ball et al., U.S. Pat. No. 5,564,832, issued Oct. 15, 1996 to Ball et al., U.S. Pat. No. 5,513,913, issued May 7, 1996, to Ball et al., U.S. Pat. No. 5,426,297, issued Jun. 20, 1995, to Dunphy et al., U.S. Pat. No. 5,401,956, issued Mar. 28, 1995 to Dunphy et al., U.S. Pat. No.

4,950,883, issued Aug. 21, 1990 to Glenn, U.S. Pat. No. 4,996,419, issued Feb. 26, 1991 to Morey, or other known or yet to be developed optical grating multiplexing instrumentation techniques, sufficient to perform the functions described herein. The converter 22 may also include sufficient hardware and/or software to convert the measured optical signal or shift into a signal indicative of the parameter being measured on the line 24.

The measured signal on the line 24 is provided to a display 26 or other visual, electronic, or printing device for communicating the measurement data from the sensors 12 to an end user 30. Also, the converter 22 may be connected by a line 29 to a data entry device 28, such as a keyboard and/or mouse.

A selection (or on/off) signal is provided to the instrumentation box 20 and is indicative of which of the sensors 12 will provide data to the end user. The sensor selection signal may be provided from the keyboard 28 or from a remote link 32 (discussed hereinafter), or on a separate line (not shown), or by other means.

The sensor selection signal may operate in numerous different ways to provide the user the selected sensor data. For example, the box 20 may provide output data to the display 26 or to the link 32 for only the selected sensors. Alternatively, the converter 22 may only provide the source signal 14 or only process or only convert the receive signals 16,18 from the selected sensors 12. Alternatively, the remote box 38 may provide output data to the remote display 40 for only the selected sensors based on the sensor selection signal. Alternatively, the box 20 may send the sensor selection signal to the remote box 38 for processing the data remotely.

In addition to or instead of the display 26, a remote link 32 may be used to communicate data between the box 20 and a remote location 34. The remote link 32 may be partially or completely wired or wireless, and may comprise an internet link. The remote link 32 may be used to communicate sensor data and/or to send the sensor selection signal to activate or inactivate certain of the sensors 12 or data therefrom between the remote location 34 and the instrument 20.

The remote location 34 may have a second instrumentation device 38 connected to the remote link 32, comprising a remote transceiver 35, a remote display 40 similar to the display 26, a data entry device 42, such as a keyboard and/or mouse. The transceiver 35 may be similar to the converter 22 if the same functions are performed, or may comprise different hardware and/or software if additional or different functions are performed as described herein.

The device 38 may retrieve or receive sensor data or other signals from the instrument 20 and/or send the sensor selection signal to the instrument 20 to activate or inactivate certain of the sensors 12. The box 38 may perform the same functions as the box 20 and/or may do other processing on the measured data as desired and/or may process billing information, or perform other functions. Also, the box 38 may perform the billing and/or receive the payments electronically, such as by wire transfer or other electronic commerce or banking technique.

Figures 2, 3:
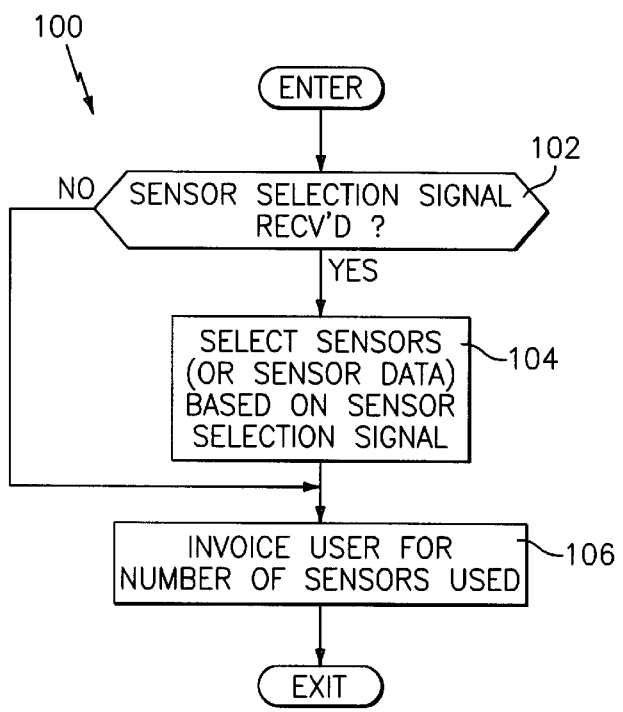
FIG. 2 is a diagram of an example digital sensor selection signal, in accordance with the present invention.
FIG. 3 is a flow diagram of possible sensor selection and billing arrangement, in accordance with the present invention.

Referring to FIG. 2, the sensor selection signal may be a digital word or group of words that indicate to the instrument 20 which of the sensors 12 will provide sensor output data. For example, FIG. 2 shows a sensor selection signal, where each bit in a 16 bit word represents the status (on/off) of data coming from a corresponding one of the sensors 12.

Alternatively, the sensor selection signal may be a code related to an end user, which pre-selects certain of the sensors 12. For example, the user may enter a user code into the device 20 and based on the user code, the box 20 selects predetermined ones of the sensors 12. Alternatively, the user may enter a user code and the user code is transmitted over the remote link 32 to the remote device 38 which selects the appropriate sensor selection signal for that user and transmits the sensor selection signal over the remote link 32 to the device 20 for selection of the appropriate sensors for that user. Alternatively, there may be a predetermined profile or schedule indicating which sensors to select based on age of the well, elapsed time, user code, or other parameters, such selection may be periodic or cyclical, such as always selecting certain sensors at certain times, and selecting certain other sensors at certain other times in a repetitive or random pattern, thereby providing automatic reconfiguration of the selected sensors without the need for user intervention.

Referring to FIG. 3, the end user 30 is only billed for and only pays for the sensors that are selected (i.e., the "on" sensors) as indicated by a top level flow chart 100. In particular, when a sensor selection signal is received, the appropriate ones of the sensors 12 or data therefrom are selected as dictated by the sensor selection signal described hereinbefore, as shown by a step 104. Then, a bill or invoice is sent to the user (or customer) and the user pays only for the number of sensors selected to receive data from, as indicated in step 106. Alternatively, the sensor selection signal may shut off all sensors (or all sensor data) if a bill is not paid by the user. The cost to (or payment by) the user may be based on the number of sensors selected, the amount of sensor data provided or the length of time the sensor data is provided, in a similar manner to that which is done for a utility company, a cable TV company, an internet service provider or the like.

Figure 4:
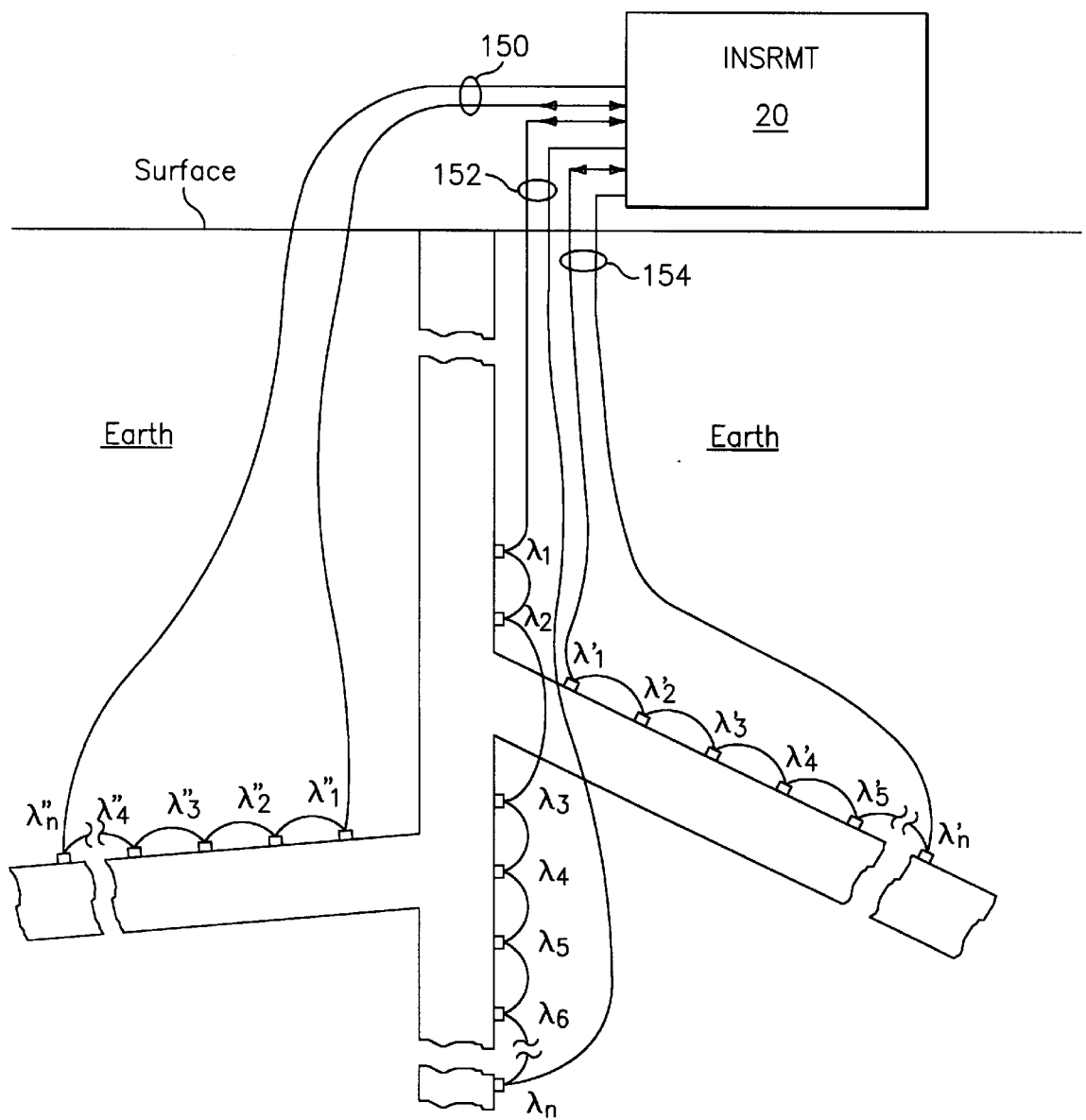
FIG. 4 is a diagram of an alternative embodiment of distributed selectable latent fiber optic sensors, having separate strings, in accordance with the present invention.

Referring to FIG. 4, instead of all the sensors 12 being connected to a single common fiber 10, a plurality of optical fibers may be connected to groups of sensors 150,152,154 each set having a single fiber or pair of fibers (for a loop design) connected to the instrument box 20. Alternatively, other fiber optic sensing configurations may be used if desired.

Also, the sensing system may be used in a land well on top of land (e.g., in a pipeline), under water, e.g., the ocean, such as on the ocean bottom, or in a sub-sea well. The sensing system may be used in harsh environments, such as in oil and/or gas wells, engines, combustion chambers, etc., or in any other sensing applications independent of the type of environment, where multiple sensors are used and there is a need to have certain sensors or sensor data selected for various reasons.

Also, it should be understood that the gratings of the invention may be used in reflection and/or transmission depending on whether the reflected or transmitted light from the grating is used to measure the measurand.

It should be understood that, unless otherwise stated herein, any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What is claimed is:

1. A distributed selectable fiber optic sensing system, comprising:

an optical fiber;

plurality of optical sensors, each sensor connected to said optical fiber and each sensor using only optical signals to measure sensed parameters, predetermined ones of said sensors receiving an optical source signal, and each providing at least one characteristic return optical signal, a parameter of said return optical signal being indicative of a sensed parameter; and an optical instrumentation device, connected to said optical fiber, which provides said optical source signal to predetermined ones of said sensors, which receives said return optical signal, and which provides an output signal indicative of selected ones of said sensed parameters, said selected ones of said sensed parameters being less than a total number of said sensed parameters.

2. The apparatus of claim 1, wherein said instrumentation device selects said selected ones of said sensed parameters based on a selection signal having a selection status corresponding to each of said sensors.

3. The apparatus of claim 2, wherein the status of said selection signal is determined based on whether a user desires to retrieve said sensed parameter.

4. The apparatus of claim 2, wherein the status of said selection signal is determined based on whether a user will pay for said sensed parameter.

5. The apparatus of claim 2, wherein the status of said selection signal is provided from a location remote from said instrumentation device.

6. The apparatus of claim 2, wherein the status of said selection signal is provided from a location remote from said instrumentation device via a remote link.

7. The apparatus of claim 6, wherein said remote link comprises an internet link.

8. The apparatus of claim 1, wherein said optical output signal is provided to a location remote from said instrumentation device via a remote link.

9. The apparatus of claim 1, wherein the optical output signal is provided to a location remote from said instrumentation device to a second instrumentation device.

10. The apparatus of claim 9, wherein said second instrumentation device selects said selected ones of said sensed parameters based on a selection signal corresponding to each of said sensors.

11. The apparatus of claim 1, wherein at least one of said sensors comprises at least one Bragg grating embedded therein.

12. The apparatus of claim 1, wherein at least one of said sensors comprises a plurality of Bragg gratings.

13. The apparatus of claim 1, wherein at least one of said sensors has at least one fiber laser, wherein said fiber laser lases at lasing wavelength which changes as said sensed parameter changes.

14. The apparatus of claim 1 wherein at least one of said sensors measure at least one parameter, such parameter being: pressure, temperature, liquid fraction, flow, acoustic, seismic, resistivity, corrosion, or pipe-wall build-up.

15. A method of paying for use of an optical sensing system in a well, comprising the steps of:

installing a plurality of optical sensors in a well, each sensor connected to an optical fiber and each sensor using only optical signals to measure sensed parameters, predetermined ones of said sensors receiving an optical source signal, and each providing at least one characteristic return optical signal, a parameter of said return optical signal being indicative of a sensed parameter;

providing data relating to said return optical signal to a user from selected ones of said sensors; and said user paying for said selected sensors.

16. The method of claim 15, further comprising selecting said selected sensors based on a selection signal corresponding to each of said sensors.

17. The apparatus of claim 15, further comprising receiving a selection signal corresponding to each of said sensors, which determines said selected sensors.

18. The method of claim 15, wherein at least one of said sensors comprises at least one Bragg grating embedded therein.

19. The apparatus of claim 15, wherein said payment is based on the number of said sensors selected.

20. The apparatus of claim 15, wherein said payment is based on the amount of data retrieved from said selected sensors.

21. The apparatus of claim 15, wherein said payment is based on the length of time data is retrieved from said selected sensors.

22. A method of billing for use of an optical sensing system in a well, comprising the steps of:

installing a plurality of optical sensors in a well, each sensor connected to an optical fiber and each sensor using only optical signals to measure sensed parameters, predetermined ones of said sensors receiving an optical source signal, and each providing at least one characteristic return optical signal, a parameter of said return optical signal being indicative of a sensed parameter;

providing data relating to said return optical signal to a user from selected ones of said sensors; and billing said user for said selected sensors.

23. The method of claim 22, further comprising selecting said selected sensors based on a selection signal corresponding to each of said sensors.

24. The apparatus of claim 22, further comprising receiving a selection signal corresponding to each of said sensors, which determines said selected sensors.

25. The method of claim 22, wherein at least one of said sensors comprises at least one Bragg grating embedded therein.

26. The apparatus of claim 22, wherein said payment is based on the number of said sensors selected.

27. The apparatus of claim 22, wherein said payment is based on the amount of data retrieved from said selected sensors.

28. The apparatus of claim 22, wherein said payment is based on the length of time data is retrieved from said selected sensors.

* * * * *